United States Patent [19]

Morrill

[11] Patent Number: 4,649,305
[45] Date of Patent: Mar. 10, 1987

[54] CAPACITOR BETWEEN MOTOR WINDINGS

[76] Inventor: Wayne J. Morrill, King & Hamsher Sts., Garrett, Ind. 45738

[21] Appl. No.: 826,686

[22] Filed: Feb. 6, 1986

[51] Int. Cl.⁴ .................. H01G 1/40; H02K 11/00; H02P 1/44
[52] U.S. Cl. .................................. 310/72; 310/87; 310/269
[58] Field of Search ............... 310/67 R, 68 R, 71, 310/72, 89, 254, 269, 87, 88; 361/402, 404, 328

[56] References Cited

U.S. PATENT DOCUMENTS

| | | | |
|---|---|---|---|
| 2,899,573 | 8/1959 | Wesolowski | 310/269 |
| 3,624,504 | 11/1971 | Joly | 310/68 R |
| 3,686,523 | 8/1972 | Gorden et al. | 310/72 |
| 4,110,879 | 9/1978 | Burke, Jr. | 310/36 |
| 4,246,505 | 1/1981 | Yasaka et al. | 310/269 |
| 4,371,802 | 2/1983 | Morrill | 310/166 |
| 4,404,488 | 9/1983 | Herr | 310/68 R |
| 4,546,300 | 10/1985 | Shaikh | 310/87 |

Primary Examiner—Patrick R. Salce
Assistant Examiner—D. L. Rebsch
Attorney, Agent, or Firm—Pearne, Gordon, McCoy & Granger

[57] ABSTRACT

An electrical motor has one or more capacitors inside the motor. Particularly, a half-pitch capacitor induction motor is shown, wherein the stator winding has a plurality of coils, one each on a tooth of the stator, and an auxiliary or capacitor winding includes a plurality of coils, one each on different ones of the teeth of the stator. The stator coils are spaced around the periphery of the stator such that spaces are provided between the coils, and one or more capacitors are provided in such spaces. These capacitors are mounted on an insulator board which provides physical mounting of the capacitors and also provides electrical connection to the capacitors to connect them all in parallel. The capacitors are then connected to the auxiliary winding. By this means, a small-sized motor without an elongated end bell permits mounting the capacitors inside the motor frame instead of outside in the usual cylindrical metal container.

18 Claims, 3 Drawing Figures

U.S. Patent   Mar. 10, 1987   4,649,305
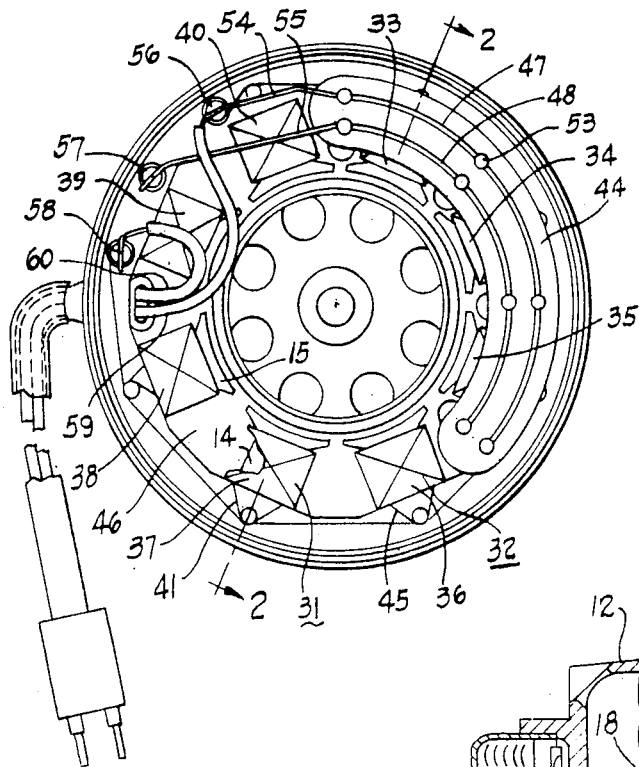
Fig. 1
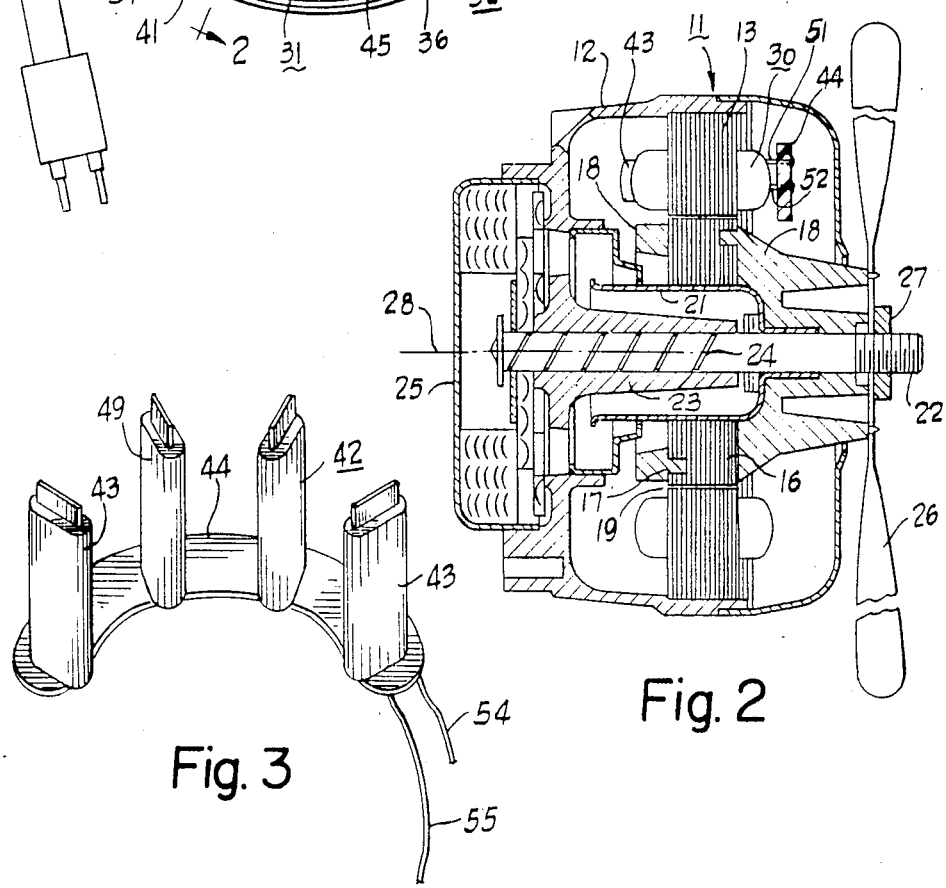
Fig. 2
Fig. 3

CAPACITOR BETWEEN MOTOR WINDINGS

BACKGROUND OF THE INVENTION

The invention relates to capacitors within a motor; capacitors have been used in the past as connected to an electric motor. Such motors may be single-phase induction motors, with a capacitor connected to a winding to establish a split phase, primarily to establish starting torque, and the typical motor of this type has a metal, cylindrical can housing, the capacitor mounted on the outside of the electric motor frame. In a few cases, the manufacturer has found room to place the capacitor inside the motor, within the end bell, for example, but this entails using an elongated end bell and elongated motor to provide space for such a capacitor.

I have previously disclosed a half-pitch capacitor induction motor operable on single-phase, and having balanced main and auxiliary windings, in U.S. Pat. No. 4,371,802. Such a motor has coils surrounding individual pole pieces rather than the usual distributed winding most often found in single-phase induction motors, yet in the motor covered by that U.S. patent the capacitor was mounted externally to the motor.

In the food processing industry, for example, sanitation is essential, and a number of electric motors are used, such as those driving fans for refrigeration equipment. In the food processing industry, it is often mandatory to hose down all equipment with a water stream once a week, or even once a day. The electric motors, therefore, must be capable of withstanding these water splash conditions, and with the prior art externally mounted capacitors, there was always the problem of properly sealing the interconnection between the metal capacitor housing and the motor housing, because electrical leads had to pass between the two. Because of this problem, capacitor-type motors were often avoided in the food processing industry, and ordinary resistance split-phase, single-phase induction motors were utilized instead, because they had a motor housing which could be more effectively sealed against the water splashing during the cleaning process.

SUMMARY OF THE INVENTION

The problem to be solved, therefore, is how to construct a capacitor-type motor which may be mounted in a motor frame without an external capacitor housing, yet retaining the same size motor frame so as to be completely interchangeable with a resistance split-phase motor.

This problem is solved by a capacitor motor comprising, in combination, a magnetically permeable stator, said stator having a plurality of salient teeth establishing a plurality of pole faces on the stator, a rotor journaled relative to said stator and magnetically cooperating with said pole faces across an air gap, a stator winding having a plurality of coils on said salient teeth, said coils and teeth having a width in the peripheral direction less than the width of the respective pole face to define a plurality of spaces between at least some of the adjacent coils, at least one elongated capacitor disposed in one of said spaces, and means connecting said capacitor to said stator winding.

Accordingly, an object of the invention is to provide a capacitor motor with capacitors inside the motor and between coils in the motor.

Another object of the invention is to provide a single-phase motor with a stator winding having coils on stator teeth and spaces between the coils with capacitors in at least some of the spaces and connected to the stator winding.

Other objects and a fuller understanding of the invention may be had by referring to the following description and claims, taken in conjunction with the accompanying drawing.

BRIEF DESCRIPTION OF THE DRAWINGS

FIG. 1 is a plan view of a motor embodying the invention, with one end bell and the rotor removed;

FIG. 2 is a longitudinal section of the complete motor taken on line 2—2 of FIG. 1; and FIG. 3 is a perspective view of an insulator board and mounted capacitors.

DESCRIPTION OF THE PREFERRED EMBODIMENT

The figures of the drawing illustrate an electric motor 11 which has a frame 12 and a magnetically permeable stator 13. This motor 11 may be any one of a number of types, for example, a synchronous motor of the hysteresis or reluctance type, or may be a type having a permanent magnet for synchronization and utilizing induction motor starting. Most of such motors would be single-phase and utilize the capacitor as connected to a part of the stator winding. Such motors may be single-phase induction motors which are capacitor-start utilizing a start switch to open the capacitor winding at near running speed, or they may be the more popular permanent split capacitor motor without a starting switch. This latter type of motor is illustrated in FIGS. 1, 2, and 3, as an example of the preferred embodiment.

This motor shown is a half-pitch capacitor induction motor, similar to that shown in my prior U.S. Pat. No. 4,371,802.

The stator has an even plurality of salient teeth 14 establishing a plurality of pole faces 15 on the stator. These salient teeth extend substantially radially inwardly toward a rotor 16, which is also magnetically permeable. Preferably, both the rotor and stator are made from laminated material, to reduce eddy currents because of operation on alternating current. The rotor 16 has skewed conductor bars 17 extending longitudinally through apertures in the rotor and joined by unitary end rings 18 to form a squirrel cage rotor cooperating across the air gap 19 with the pole faces 15. The rotor 16 is mounted on a hub 21 which is hermetically mounted to a central shaft 22, and this shaft is journaled in an apertured central extension 23 of the frame 12. The shaft 22 may contain a helical groove 24 to move oil or other lubricant from a lubricant reservoir 25 secured to one end of the frame 12. This provides lubrication between the shaft 22 and the central extension 23. The shaft 22, hub 21, and laminations of the rotor 16 are all integral and rotate together. The rotor is adapted to drive a load, such as a fan blade 26 secured to the shaft by a nut 27.

The stator 13 includes a stator winding 30, which includes a main winding 31 and an auxiliary winding 32. In this preferred embodiment, each winding has an equal number of poles, and includes one coil per pole. FIG. 1 illustrates one embodiment of the invention, wherein a four-pole motor is illustrated. Accordingly, the main winding has coils 33, 35, 37, and 39 connected in series by a conductor 41, and the auxiliary winding 32 has coils 34, 36, 38, and 40 connected in series by a conductor 45. The series main winding coils are connected across the input AC voltage source, and the series auxiliary winding coils are connected in series with capacitive means 42, and then across the AC voltage source.

The capacitive means 42 includes one or more capacitors 43, and in practice, this may be three or four individual capacitors 43 mounted on an insulator 44. This insulator is a rigid, arcuate insulator with a radius equal to the radial distance between the shaft axis 28 and the midpoint of the coils 33-40. Since each coil spans only a single tooth 14, each coil is made from a conductor which is as short as possible, to establish magnetic flux in the respective tooth. Also, one individual coil per tooth establishes spaces 46 between adjacent coils in a peripheral direction, and it is in these spaces 46 in which the one or more capacitors 43 are installed. First and second conductors 47 and 48 are provided on the insulator 44 and these may be provided by printed circuit board techniques or thick film techniques customary in the industry. The insulator board 44 is provided with small apertures through the board which intersect the conductors 47 and 48. Each individual capacitor 43 is provided with an insulating sheath 49 for further insulation between the capacitors and the coils, and each capacitor has first and second leads 51 and 52 which pass through the apertures in the insulator 44 and are electrically connected to the conductors 47 and 48, respectively. This may be in the manner of normal connection of electrical components on a printed circuit board, for example, by wave soldering, as at 53, and this provides mechanical support of the capacitor from the insulator as well as electrical connection to the conductors 47 and 48. Lead wires 54 and 55 extend from the conductors 47 and 48, respectively, to binding posts 56 and 57. A third binding post 58 is also provided on the stator 13, and these three binding posts may be utilized as terminations for the main and auxiliary windings for connection to two leads 59 and 60, which permit connection to an external AC source.

The subcombination of the insulator 44 and capacitors 43 is shown in FIG. 3 as removed from the motor, and FIGS. 1 and 2 show the capacitors installed inside the motor, with the insulator board 44 positioned closely adjacent one end of a plurality of the coils 33-40, and with the capacitors 43 installed in four of the spaces 46.

In the preferred embodiment, the stator teeth are symmetrically placed around the periphery of the stator, which means that the spaces 46 are also symmetrically spaced, although they may be asymmetrical in order to provide additional space at certain preferred locations at which the capacitors could be located. Also in this preferred embodiment, the pole faces are all symmetrical for a balanced half-pitch capacitor induction motor which is energized by single-phase, but actually creates a two-phase motor, with the auxiliary winding 32 establishing a flux substantially 90 degrees electrically displaced from the flux of the main winding 31. This provides a highly efficient motor in the subfractional horsepower size, which is quiet yet has good starting torque.

In one practical motor constructed in accordance with the invention, there were four such capacitors 43 utilized, each being 0.8 microfarads in capacity, for a total of 3.2 microfarads when all were connected in parallel by the conductors 47 and 48. These capacitors, when connected in series with the auxiliary winding 32, provided the balanced half-pitch capacitor induction motor which had about 15 watts input and 6 watts output, for about 40 percent efficiency. In some cases, only three such capacitors may be utilized, whereas, as many as up to eight may be utilized in this particular four-pole motor with eight spaces 46. The number of teeth 14 on the stator is twice the number of poles in the motor, and the number of coils equals the number of teeth, so that there is at least one coil on each tooth.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of the circuit and the combination and arrangement of circuit elements may be resorted to without departing from the spirit and the scope of the invention as hereinafter claimed.

What is claimed is:

1. A capacitor motor comprising, in combination:
a magnetically permeable stator;
said stator having a plurality of salient teeth establishing a plurality of pole faces on the stator;
a rotor journaled relative to said stator and magnetically cooperating with said pole faces across an air gap;
a stator winding having a plurality of coils on said salient teeth;
said coils and teeth having a width in the peripheral direction less than the width of the respective pole face to define a plurality of spaces between at least some of the adjacent coils;
at least one elongated capacitor disposed in one of said spaces; and
means connecting said capacitor to said stator winding.

2. A capacitor motor as set forth in claim 1, including a frame, said stator being mounted in said frame, and means journaling said rotor in said frame.

3. A capacitor motor as set forth in claim 1, wherein said salient teeth are substantially radially inwardly directed from said stator.

4. A capacitor motor as set forth in claim 3, wherein said rotor is disposed inside said stator.

5. A capacitor motor as set forth in claim 3, including an insulator at least partially circular and having a radius substantially equal to the radial dimension from the axis of the rotor to said spaces, and means mounting said at least one capacitor on said insulator.

6. A capacitor motor as set forth in claim 5, including conductors on said insulator, and said mounting means including means connecting the leads of said at least one capacitor to said conductors.

7. A capacitor motor as set forth in claim 6, wherein said conductors are printed on said insulator.

8. A capacitor motor as set forth in claim 5, including a plurality of capacitors mounted on said insulator spaced in accordance with the position of said spaces between adjacent poles.

9. A capacitor motor as set forth in claim 5, wherein said insulator is rigid.

10. A capacitor motor as set forth in claim 1, wherein each of said teeth has thereon at least one coil of said stator winding.

11. A capacitor motor as set forth in claim 1, wherein said coils and teeth are symmetrically spaced around the periphery of said stator.

12. A capacitor motor as set forth in claim 1, wherein said pole faces are symmetrically spaced around the periphery of said stator.

13. A capacitor motor as set forth in claim 1, including an insulator disposed at one end of said stator, and means mounting said at least one capacitor on said insulator.

14. A capacitor motor as set forth in claim 13, including conductors on said insulator, and means connecting the leads of said capacitor to said conductors.

15. A capacitor motor as set forth in claim 1, wherein said plurality of teeth are two times the number of poles.

16. A capacitor motor as set forth in claim 1, wherein said plurality of coils c establish c/2 number of poles.

17. A capacitor motor as set forth in claim 16, wherein said stator winding has a plurality of coils in a main winding and a plurality of coils in a capacitor winding, a pole face being on each of said teeth, and the pitch of the pole face for a pole of said capacitor winding being substantially equal o the pitch of the pole face for a pole of said main winding.

18. A capacitor as set forth in claim 17, including a plurality of capacitors, one each in a plurality of said spaces, and means connecting said plurality of capacitors in parallel and then in series with said capacitor winding.

* * * * *